A. SCHICK.
CUSHION TIRE.
APPLICATION FILED JUNE 17, 1913.
1,132,798.　　　　　　　　　　　　　　Patented Mar. 23, 1915.
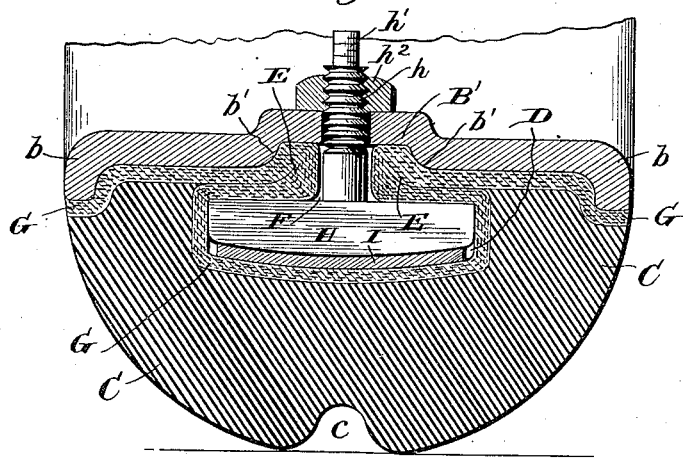
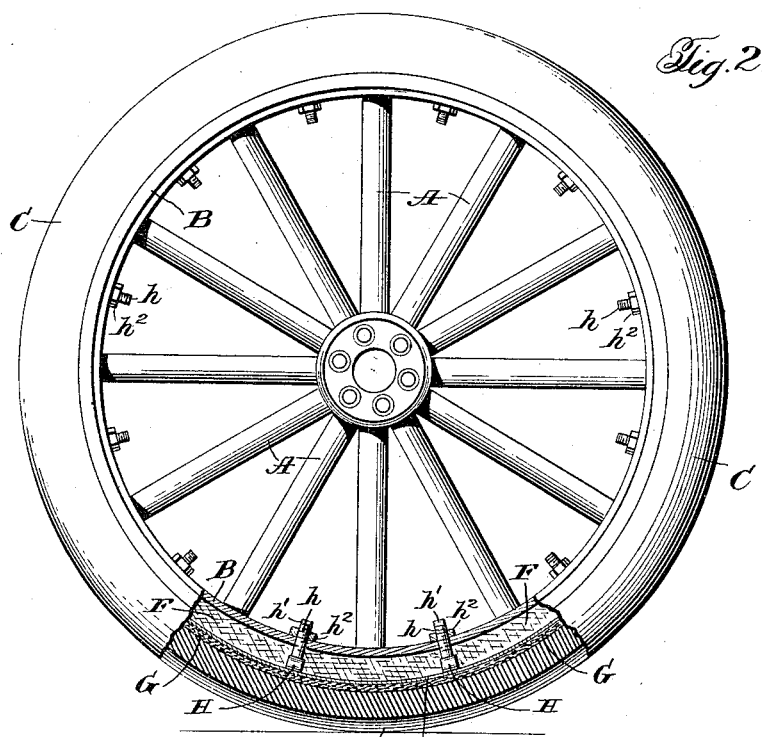
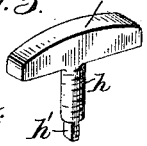
Witnesses:
Jas. E. Hutchinson
Geo. D. Riley
Inventor:
Adolph Schick,
By Bacon & Milans Attorneys

UNITED STATES PATENT OFFICE.

ADOLPH SCHICK, OF WHEELING, WEST VIRGINIA.

CUSHION-TIRE.

1,132,798.  Specification of Letters Patent.  Patented Mar. 23, 1915.

Application filed June 17, 1913. Serial No. 774,216.

*To all whom it may concern:*

Be it known that I, ADOLPH SCHICK, a citizen of the United States, residing at Wheeling, in the county of Ohio and State of West Virginia, have invented certain new and useful Improvements in Cushion-Tires, of which the following is a specification, reference being had therein to the accompanying drawing.

This invention relates to an improvement in cushion tires and it is embodied in the construction shown in the accompanying drawing hereinafter specifically referred to.

The objects of the invention are primarily to provide a rubber tire so constructed that it will be easily attached and detached from the rim; one wherein the tire element may be firmly held in place without the necessity of employing attaching bands or removable side rings. In tires of this character, it has been found essential and advantageous to localize the fastening or securing means well toward the center giving more or less freedom to yieldability of the outer edges or sides of the flexible tire. It is also desirable to be able to remove the tires and replace them readily without the employment of permanently connected rings or fasteners.

An object of the present invention is to enable the user to apply and remove the tire expeditiously and at the same time to provide means for retaining the tire fixedly and securely on the rim.

In the accompanying drawing, Figure 1 is a cross sectional view of the tire embodying the invention, Fig. 2 represents a side elevation partly in section of a wheel equipped with the tire, and Fig. 3 is a detail view of one of the locking keys.

In the drawing, A represents wheel spokes and B the rim. This rim is of shallow channel formation having slightly raised edges $b$. The center of the rim is depressed into a channel form B′, which extends circumferentially around the rim, forming in that particular a central channel with rounded contiguous shoulders $b'$. The extreme outer edges of the flanges $b$ may be properly curved.

C represents the rubber tire having a circumferential depression $c$ in its outer face, which outer face is otherwise curved gradually as shown. The maximum width of the rubber tire is equal to the width of the rim, there being formed at the point of contact with the flange $b$ a shoulder part fashioned to correspond substantially with the curvature and formation of the rim. Extending longitudinally through the center of the tire slightly below the center axis thereof is a channel D, being conveniently substantially rectangular in cross section extending entirely around or through the rubber tire. The bottom or inner walls of the channel D are represented by what may be properly termed securing flaps E which have thickened edge parts with their lower faces fashioned to correspond with the curved part $b'$ and the flat part of the channel B′. These securing flaps terminate somewhat short of the center of the tire leaving a continuous space F therebetween which extends the length of the tire but in width is less than the width of the channel D, as clearly shown in Fig. 1. Extending conveniently from the outer side parts of the rubber tire along the base thereof are a series of fabric reinforces G, the same being vulcanized into the flaps E and extending entirely around the channel D. This fabric reinforce is so positioned as to add the required strength to the base of the tire but additional reinforce may be added when required and at such points as may be found necessary.

H represents the tire fasteners and, as represented in Fig. 3, consists conveniently of a metal head of oblong form, the length of which corresponds substantially with the width of the channel D. The upper face of the block is curved, while the under face is conveniently straight. Projecting from the under face of the block centrally is a screw threaded stem $h$ having its squared end $h'$, to which a turning tool may be applied for turning the fastener into proper securing position, the diameter of this stem being such as to readily pass through the space between the flaps E. The head H in width is substantially the width of the space between the flaps so that when the head is turned in line with said space, it can be passed through the space into the channel D and then by a quarter turn stand at right angles to the opening and crosswise of the channel. The rim B is, conveniently, at points between adjacent spokes, perforated to receive the screw shanks $h$, as shown in Fig. 1. The protruding ends of the shanks are fitted with nuts $h^2$.

The distance between the securing devices H is such as to leave considerable space and thereby render the tire as such somewhat on the order of a hollow cushion tire but to add somewhat to the rigidity of the outer walls of the channel D, a band of metal I is placed in the channel, between the fastening devices H and the upper wall of the channel. This band need not necessarily be continuous, as it is simply fitted into the channel, serving to reduce wear between the rubber tire and the fastening devices and also, as above stated, add somewhat to the rigidity of the tire.

In operation, owing to the formation of the rubber tire and the shallow channel shaped rim, it is easy to slip the rubber tire over the flange b at one side into the rim notwithstanding the reinforcements G. The tire after it is seated in the rim has the flap parts E with their broadened inner edges, located centrally and entering the channel B' of the rim. When the tire is in this position, it is only necessary to force the heads of the fastening devices H upwardly through the space between the flaps into the channel D and to give the same one quarter of a turn, as shown in Fig. 1, and while in that position clamp the flaps E tightly between the heads H and the rim B, thus forming a clench between the ends of the flaps and retaining the tire properly in position against sidewise movement. It may be noted that the vertical width of the head H of the fastening device is such that when located in the channel B' the outer edges thereof will be substantially in the plane of the top of the flanges b, so that the tire can be moved readily over the heads when being placed in position or taken from the rim. By forming the heads somewhat rounded on their upper faces, a proper contact is provided and cutting of the material avoided.

While I have shown a special form of construction, it will be understood that changes can be made without departing from the nature and principle of the invention.

Having thus described the invention, what is claimed as new and desired to be secured by Letters Patent is:

1. In a vehicle wheel, the combination of a rim having a central channel part and narrow outstanding flanges at its edges, of a rubber tire having a central continuous channel therein, the bottom walls of the channel constituting securing flaps extending crosswise of and resting against the rim, said securing flaps having flat upper faces and thickened parts at their inner edges extending into the said central channel of the rim and separated from each other to form a space, fastening devices having heads of a width to pass through the spaces between the flaps and of a length substantially the width of the channel, the heads of the fastening devices being adapted to bear against the top of the securing flaps throughout substantially the full width of the same, a screw stem on the heads of the fastening devices passing through the rim, and a nut for drawing the fastening devices on to the flaps.

2. In a vehicle wheel, the combination of a rim having a central channel part and narrow outstanding flanges at its edges, of a rubber tire having a central continuous channel therein, the bottom walls of the channel constituting securing flaps extending crosswise of and resting against the rim, said securing flaps having flat upper faces and thickened parts at their inner edges extending into the said central channel of the rim and separated from each other to form a space, fastening devices having heads of a width to pass through the spaces between the flaps and of a length substantially the width of the channel, the heads of the fastening devices being adapted to bear against the top of the securing flaps throughout substantially the full width of the same, a screw stem on the heads of the fastening devices passing through the rim, a nut for drawing the fastening devices on to the flaps, reinforcing means in the said flaps extending into the body of the tire, and a metal band in the outer part of said central channel interposed between the heads of the fastening devices and the upper wall of the central channel of the tire.

In testimony whereof I affix my signature in presence of two witnesses.

ADOLPH SCHICK.

Witnesses:
 ELLA WALTERS,
 JOHN WALTERS.

Copies of this patent may be obtained for five cents each, by addressing the "Commissioner of Patents, Washington, D. C."